US011904189B2

(12) United States Patent
Walker et al.

(10) Patent No.: US 11,904,189 B2
(45) **Date of Patent: *Feb. 20, 2024**

(54) RESPIRATOR SYSTEM INCLUDING REMOVABLE HEAD SUSPENSION

(71) Applicant: 3M INNOVATIVE PROPERTIES COMPANY, St. Paul, MN (US)

(72) Inventors: Garry J. Walker, Stockton-on-Tees (GB); Mark A. J. Fernandes, Warwickshire (GB); Richard D. Williams, Lancaster (GB)

(73) Assignee: 3M Innovative Properties Company, St. Paul, MN (US)

( * ) Notice: Subject to any disclaimer, the term of this patent is extended or adjusted under 35 U.S.C. 154(b) by 420 days.

This patent is subject to a terminal disclaimer.

(21) Appl. No.: 16/949,887

(22) Filed: Nov. 19, 2020

(65) Prior Publication Data

US 2021/0077838 A1 Mar. 18, 2021

Related U.S. Application Data

(63) Continuation of application No. 12/743,372, filed as application No. PCT/US2008/081280 on Oct. 27, 2008, now Pat. No. 10,864,389.

(60) Provisional application No. 60/990,647, filed on Nov. 28, 2007.

(51) Int. Cl.
*A62B 18/02* (2006.01)
*A62B 17/04* (2006.01)

(52) U.S. Cl.
CPC .................................... *A62B 17/04* (2013.01)

(58) Field of Classification Search
CPC ........... A61B 9/04; A62B 17/04; A62B 18/00; A62B 18/003; A62B 18/04; A62B 18/084; A41D 13/1153; A52B 3/286; A42B 3/085; A61M 16/009; A61M 16/0627; A61M 16/0633
See application file for complete search history.

(56) References Cited

U.S. PATENT DOCUMENTS

| | | | |
|---|---|---|---|
| 2,896,617 | A | 11/1955 | Gibbons |
| 3,050,736 | A | 8/1962 | Malcom, Jr. |
| 3,555,562 | A | 1/1971 | Patton |
| 3,955,570 | A | 5/1976 | Hutter |
| 4,476,615 | A | 10/1984 | Cook |
| 4,730,612 | A | 3/1988 | Dampney |
| 4,901,716 | A | 2/1990 | Stackhouse |
| 5,007,421 | A | 4/1991 | Stewart |
| 5,291,880 | A | 3/1994 | Almovist |

(Continued)

FOREIGN PATENT DOCUMENTS

| | | |
|---|---|---|
| DE | 10 2004 038303 | 8/2004 |
| GB | 2058577 | 4/1981 |

(Continued)

*Primary Examiner* — Margaret M Luarca

(57) ABSTRACT

A respirator system is disclosed that includes a foldable head cover assembly including a face seal portion. The respirator assembly further includes a visor assembly attached to the head cover assembly and a head suspension system removably attached to the visor assembly. The visor assembly and the head cover assembly on one hand, and the suspension system on the other, are separable and foldable to enable storing and/or shipping the same separately. A head suspension system is also disclosed.

12 Claims, 8 Drawing Sheets

(56) References Cited

U.S. PATENT DOCUMENTS

| | | | |
|---|---|---|---|
| 5,878,742 | A | 3/1999 | Figueredo |
| 6,328,031 | B1 | 12/2001 | Tischer |
| 6,367,085 | B1 | 4/2002 | Berg |
| 6,393,617 | B1 * | 5/2002 | Paris ...................... A62B 17/04 2/171.3 |
| 6,578,572 | B2 | 6/2003 | Tischer et al. |
| 6,588,424 | B2 | 7/2003 | Bardel |
| 6,691,314 | B1 | 2/2004 | Grilliot |
| 6,889,390 | B1 | 5/2005 | Morgan et al. |
| 7,077,128 | B2 | 7/2006 | Wilson |
| 7,104,264 | B2 | 9/2006 | Lee et al. |
| 8,011,027 | B2 | 9/2011 | Brookman |
| 8,176,913 | B2 | 5/2012 | Ivory |
| 2002/0000004 | A1 | 1/2002 | Wise |
| 2002/0009522 | A1 | 7/2002 | Fabin |
| 2005/0061317 | A1 | 3/2005 | King |
| 2005/0251890 | A1 | 11/2005 | Landis |
| 2006/0201511 | A1 | 9/2006 | Freriks et al. |
| 2007/0095344 | A1 | 5/2007 | Abernethy |
| 2008/0017196 | A1 | 1/2008 | Kamneva |
| 2008/0083410 | A1 | 4/2008 | Resnick |

FOREIGN PATENT DOCUMENTS

| | | |
|---|---|---|
| WO | WO 96/25983 | 8/1996 |
| WO | WO 2006/012870 | 2/2006 |
| WO | WO 2006/055724 | 5/2006 |

* cited by examiner

RESPIRATOR SYSTEM INCLUDING REMOVABLE HEAD SUSPENSION

CROSS REFERENCE TO RELATED APPLICATIONS

This is a continuation of U.S. application Ser. No. 12/743,374, filed May 18, 2008, now pending, which is a national stage filing under 35 U.S.C. 371 of PCT/US2008/081280, filed Oct. 27, 2008, which claims priority to U.S. Provisional Application No. 60/990,647, filed Nov. 28, 2007, the disclosure of which is incorporated by reference in its/their entirety herein.

BACKGROUND

The present disclosure is related generally to a respirator system. More particularly, it relates to a respirator system including a head cover assembly, a visor assembly attached to the head cover assembly and a head suspension system releaseably attached to the visor assembly.

Respirator systems are often used to aid a user's breathing in an environment containing dusts, fumes, vapors, and/or gases. Respirator systems come in a wide range of types and sizes and may be used by the military, industry, and the public for a variety of purposes. Respirator systems include, without limitation, respirator hoods and respirator head covers that usually include a soft, flexible material suitable for the environment in which it is to be worn. A visor or face shield is typically included in the respirator system and may have any suitable configuration to provide appropriate amount of substantially unrestricted vision for the user of the surrounding environment.

Many common respirator systems are mounted on a user's head by means of a head suspension system attached to the interior of the hood. The head suspension system that supports the visor is typically fixedly retained to the flexible hood, as by stitching it at various points to the interior of the hood. A respirator system typically includes a shell that separates a user's breathing zone or an interior gas space from the surrounding exterior gas space. The breathing zone is located between the shell and the wearer's face, and, in a typical head cover, the shell may be defined by at least a head cover assembly and a visor assembly. In a supplied air respirator system, clean air is forced into the interior gas space from an air supply tank or from a powered air source that drives ambient air through an air filter, usually by means of a hose. The wearer breathes the air and exhales it back into the breathing zone. This exhaled air, along with excess clean air that is forced into the breathing zone, may exit the breathing zone through openings in the face seal or through any other suitable route. In the former case, the positive pressure that generally occurs within the interior gas space typically precludes contaminants from entering the interior gas space through the openings.

Known constructions of respirator systems utilizing head covers include head harnesses that are fixedly secured to the head cover. Such respirator systems, therefore, have to be stored and/or shipped as a unit, resulting in added storage and shipping costs. In addition, should one or more of their components, such as the visor or the material of the head cover become damaged or otherwise unusable, the entire respirator system may have to be thrown away or the salvaging of undamaged components may become a relatively tedious process.

SUMMARY

Accordingly, there exists a continuing desire to provide improvements in this field, particularly in terms of being able to separate and fold the components of respiratory systems in order to store and/or ship the same separately.

In one exemplary embodiment, the present disclosure provides a respirator system including a foldable head cover assembly including a face seal portion. The respirator system further includes a visor assembly attached to the head cover assembly. A head suspension system is removably attached to the visor assembly.

In another exemplary embodiment, the present disclosure provides a head suspension system adapted to be removably attached to a visor assembly of a respirator system. The respirator system includes a foldable head cover assembly. The head suspension system includes a headband member adapted to be mounted on a wearer's head and at least two release mechanisms, each release mechanism configured to removably attach to the visor assembly. The head suspension system in unfolded state forms a generally planar configuration.

The aforementioned aspects and other features of the present disclosure are described in detail in conjunction with the accompanying drawings in which the same reference numerals are used throughout several views for denoting the same structure.

BRIEF DESCRIPTION OF THE DRAWINGS

The disclosed subject matter will be further explained with reference to the attached figures, wherein like structure is referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure provides advantages beyond those of known respirator systems. For example, the present disclosure provides a respirator system having a head suspension system that enables relatively easy assembly and disassembly of the system components into compact relatively planar configurations, while still maintaining the integrity of the breathing zone when assembled and in use.

The words "a", "an", and "the" are used interchangeably to mean one or more of the elements being described. Usage of words of orientation, such as "top", "bottom" and the like for location of the various elements in the disclosed articles refers to the relative position of an element with respect to a horizontally disposed body portion. It is not intended that the disclosed articles should have any particular orientations in space during or after their manufacture.

Figure 1:
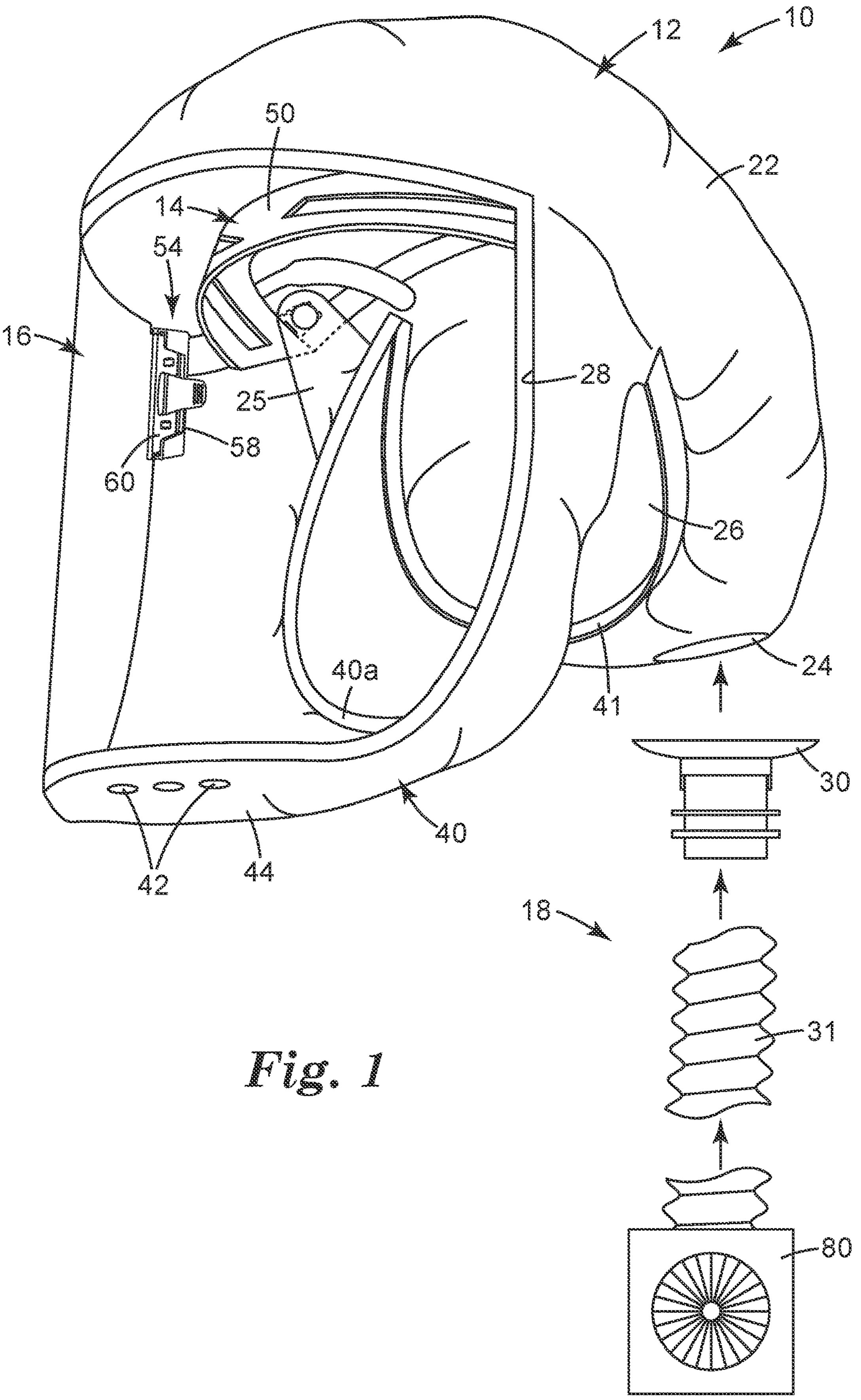
FIG. 1 is a schematic perspective view of one exemplary embodiment of a respirator system constructed according to the present disclosure.

FIG. 1 illustrates an exemplary embodiment of a respirator system 10 constructed according to the principles of the present disclosure that facilitate relatively easy disassembly thereof into relatively planar configurations for shipping and yet allow to maintain integrity of the respirator system when it is assembled and in use.

In one exemplary embodiment of the present disclosure, provision may be made for a respirator system 10 that has its major components separable and foldable, whereby they may be folded and shipped in separate containers. As shown in FIG. 1, the respirator system 10 may include a head cover assembly 12, a head suspension system 14, a visor assembly 16, and an air delivery system 18. In one exemplary embodiment, the present disclosure may be directed to a respiratory system that uses a powered air purifying respirator (PAPR) system having a blower to force ambient air through air-purifying elements to an inlet opening 24 of the respirator system. However, the present disclosure is not limited thereto and may include any other suitable air supply system, including but not limited to negative pressure systems. Other exemplary air supply systems may include, without limitation, any suitable supplied air system or a compressed air system, such as a self contained breathing apparatus (SCBA).

Figure 5:
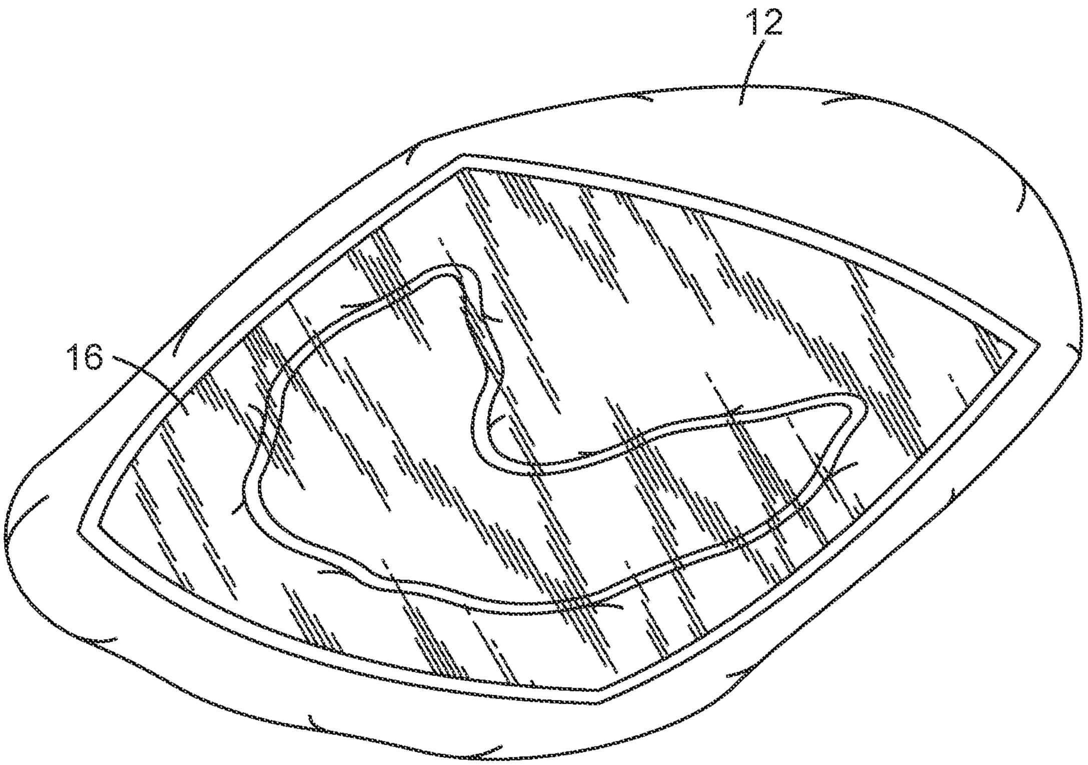
FIG. 5 is a perspective view of a folded visor assembly and a head cover assembly, with the head suspension system removed, according to one embodiment of the present disclosure.
Figure 9:
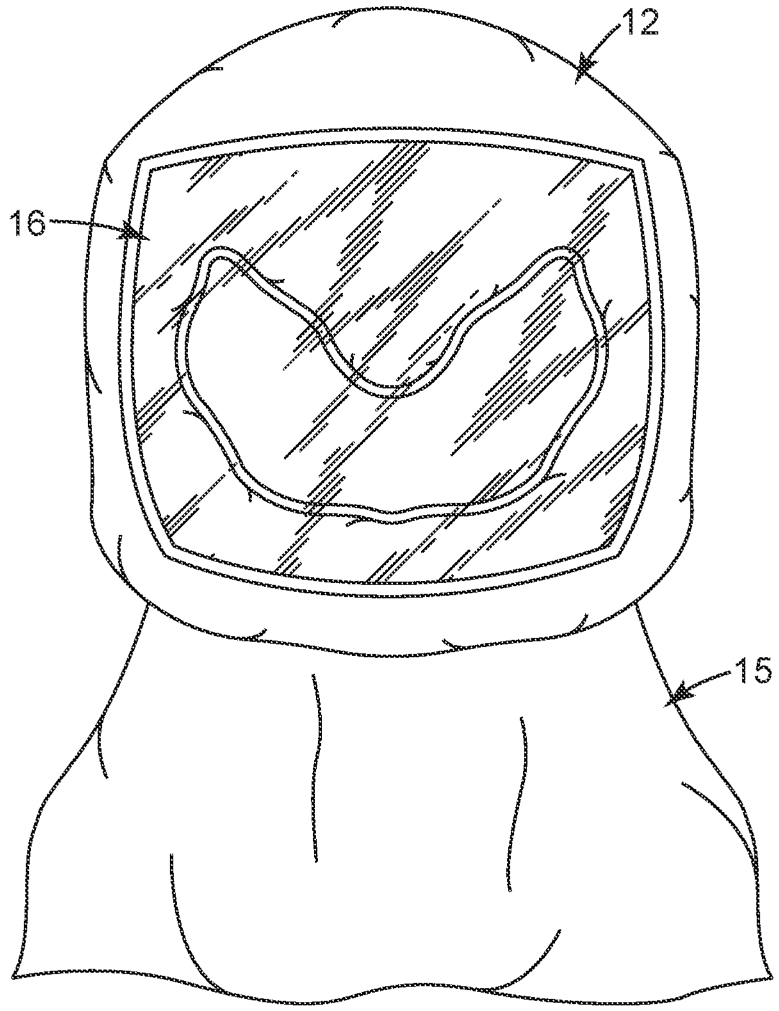
FIG. 9 is a perspective view of a folded visor assembly and a head cover assembly, with the head suspension system removed, according to an embodiment of the present disclosure that includes a shroud.

The head cover assembly 12 and the visor assembly 16 may be mounted on a user's head by means of a head suspension system 14. The head cover assembly 12 and the visor assembly 16 may form a shell that separates a breathing zone or an interior gas space from the surrounding exterior gas space. The visor assembly 16 includes a transparent member, which may be made of any suitable transparent material, such as a plastic material. Preferably, the visor is rigid and flexible, so that it could be bent to form a generally cylindrical surface, when the respirator system is assembled, e.g., as shown in FIG. 1, and so that the visor could be flattened to form a generally planar configuration, when the head suspension system is removed, e.g., as shown in FIGS. 5 and 9. Polyester or acetate may be used to make the visor. The visor assembly 16 may include a highly transparent portion disposed before the eyes of a user, and/or it may have a partially transparent portion that limits the views. The visor assembly 16 may also be constructed to provide protection against splash hazards and/or provide the wearer with a particular field of vision. While a particular visor assembly is illustrated, other suitable types of visor assemblies may be provided that are consistent with the use in a particular respirator system.

Initial reference is made to one exemplary embodiment of a head cover assembly 12 that may be adapted to be used, in combination, with an air supply system 80. The head cover assembly 12 may include a head covering member 22 and a face seal portion 40. The exemplary head covering member 22 is constructed to fit over and around the head and ears of a user. Other head covering members may be configured to provide coverage for a user's ears, and, in some cases, also for the neck and shoulders of the wearer. Such additional coverage may be provided by a shroud 15 (shown in FIG. 9) extending over the neck and shoulders of a user. The head covering member 22 may be, at least in part, made of any suitable flexible material type known in the art that may be applicable and suitable for the purposes intended. For example, a respirator head covering member 22 may be used in pharmaceutical, medical, military, and nuclear industries, as well as any other related industries and for any other suitable purposes. The present disclosure is directed to the head covering member 22 capable of being folded, and, preferably, capable of being folded into a relatively planar configuration suitable for shipping. Exemplary head covering members may include, without limitation, non woven materials, such as webs made with polyethylene, polypropylene, or the like, and woven materials, such as nylons or coated nylons, or the like.

The head covering member 22 may include an inlet opening 24 for cooperation with the air supply system 80, a head opening 26 for receiving the head of a user, and a visor opening 28 for accommodating the visor assembly 16. The visor assembly 16 may be removably or permanently attached to the head cover assembly 12 along the opening 28, for example, by stitching, welding, heat sealing, bonding, or the like. A shroud 15 (shown in FIG. 9) may be included in the head cover assembly, for example, by attaching it along the head opening. The inlet opening 24 may be positioned in the back of the head covering member 22. An air inlet fluid coupling arrangement 30 (shown in FIG. 2) may be connectable to a hose 31, which, in turn, may be connected to the air supply system 80. The air supply system 80 may include a filtering system (not shown) which filters the outside air and transfers the filtered air to the interior of the head cover assembly. This prevents the wearer from coming in contact with the outside air, which may be unsuitable for unaided breathing.

In an exemplary embodiment, air that enters through the inlet opening 24 of the respirator system shell is allowed to pass into the breathing zone. In the exemplary embodiment illustrated in FIG. 1, the air that enters through the inlet 24 is allowed to circulate between the shell (here, defined by the head cover assembly 12 and the visor assembly 16) and a user's head. More particularly, typical embodiments of the present disclosure do not include air-directing ducts disposed about the user's head. Examples of air-directing ducts would be air-directing manifolds having an inlet coupled to the inlet opening 24 and one or more outlets disposed in the vicinity of a user's face. Other examples of air-directing ducts would be rigid, partially rigid or flexible air-directing manifolds, such as where air passes between two flexible sheets of material, which may be stitched together.

Figure 2:
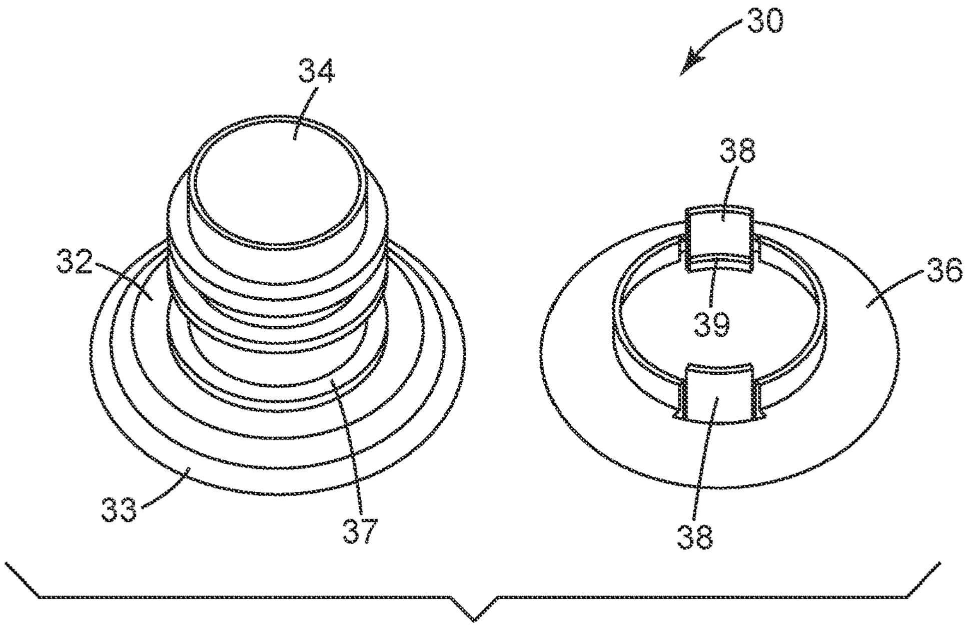
FIG. 2 is a perspective exploded view of an exemplary fluid coupling arrangement.

Referring now to FIG. 2, the fluid coupling arrangement 30 may include a fluid coupler hose connector 32 that has a tube portion 34 that may be adapted to protrude from the interior of the head covering member 22, when inserted into the inlet opening 24, and a ring portion 33. The fluid coupling arrangement 30 may be adapted to be connected to a hose (not shown) by a snap-fit connection, threaded connection, or the like. A securing collar 36 has a central opening for accommodating the tube portion 34. A peripheral ridge 37 on the tube portion 34 may be adapted to releaseably cooperate with biased finger detents 38 on the securing collar 36 to removably attach the securing collar 36 to the hose connector 32 and the head covering member 22. It will be appreciated that the material of the head covering member 22 disposed near the inlet opening 24 may be sandwiched between the securing collar 36 and the ring portion 33 when the hose connector 32 is releasably engaged with the securing collar 36.

In one exemplary embodiment, to fit the securing collar 36 over the tube portion 34 and against the ring portion 33, the finger detents 38 are pressed inwardly relative to a central axis of the opening in the tube portion. Accordingly, an inner locking edge 39 will pivot away form the central axis. After the securing collar 36 is placed over the tube portion, the pressing forces may be released, whereby the inherent bias provided for each of the finger detents 38 drive the locking edge 39 to engage a ridge 37. As such, the securing collar 36 is securely joined or attached to the hose connector 32 and releasably secures the material of the head covering member 22 therebetween. Advantageously, the foregoing connection provides for enhanced ease of assembly as well as disassembly of the respirator system. It will be recognized that the present disclosure envisions other kinds of coupling devices for delivering breathable air from an external source to the interior of the respirator assembly 10.

Referring now to FIG. 1, the head cover assembly 12 further includes a face seal portion 40, which may be disposed adjacent the head opening 26, so as to engage a wearer's face and aid in separating the breathing zone from the outside environment. The face seal 40 may be stitched into the head cover assembly 12. Preferably, the face seal 40 is made of a soft material due to the need to put it in contact with a user's skin. In an exemplary embodiment, the outer periphery 40*a* of the face seal portion 40 is constructed to be disposed at least around the mouth and nose of a wearer. In one embodiment, the outer periphery 40*a* of the face seal 40 is disposed at least in part under the user's chin.

The face seal may be at least partially elastic, so that it could move with the user's jaw when the user talks. Elastic properties also enable the face seal portion 40 to fit securely about the user's face after being stretched. In a typical embodiment, the face seal portion 40 has an elastic member disposed along the periphery 40*a* of the face seal 40 and characterized by at least a certain degree of sealing effectiveness or integrity that reduces or minimizes the leakage of air into the breathing zone. For example, the face seal portion 40 may include an elastic band (not shown) that can be made from any suitable material, such as Spandex™ or the like. Alternatively, the face seal portion 40 itself may have elastic properties. An elastic member 41 may also be provided with the head covering member 22 to improve its fit about a wearer's head.

The face seal portion 40 may include one or more openings 42 in its bottom portion 44. The openings 42 in the bottom portion 44 allow the breathable air delivered to the head covering member to exit upon exhaling. In another exemplary embodiment, instead of the one or more openings 42, the bottom portion 44 may include relatively air permeable material that will allow air to escape. Other approaches for allowing air out of the respirator system 10 may be used with exemplary embodiments of the present disclosure.

In some exemplary embodiments, the head cover assembly 12 includes one or more tabs 25 attached thereto. Preferably, the head cover assembly 12 includes a pair of tabs 25, disposed in the interior of the respirator system 10 and attached to the head cover assembly 12 on opposing sides thereof. In one exemplary embodiment, a tab 25 is attached to each of the opposing sides of the face seal 40 (e.g., on the left and right sides with respect to a user's face), as illustrated in FIG. 1. The tabs 25 may be formed from the same material as the head covering member and/or the face seal. In one exemplary embodiment, the one or more tabs are elastic to at least some degree. In the illustrated embodiment, each of the tabs 25 extends inwardly in the respirator system 10 and is configured to cooperate with the head suspension system 14, e.g., for effecting a releasable attachment of the head cover assembly 12 to the head suspension system 14.

Figure 3:
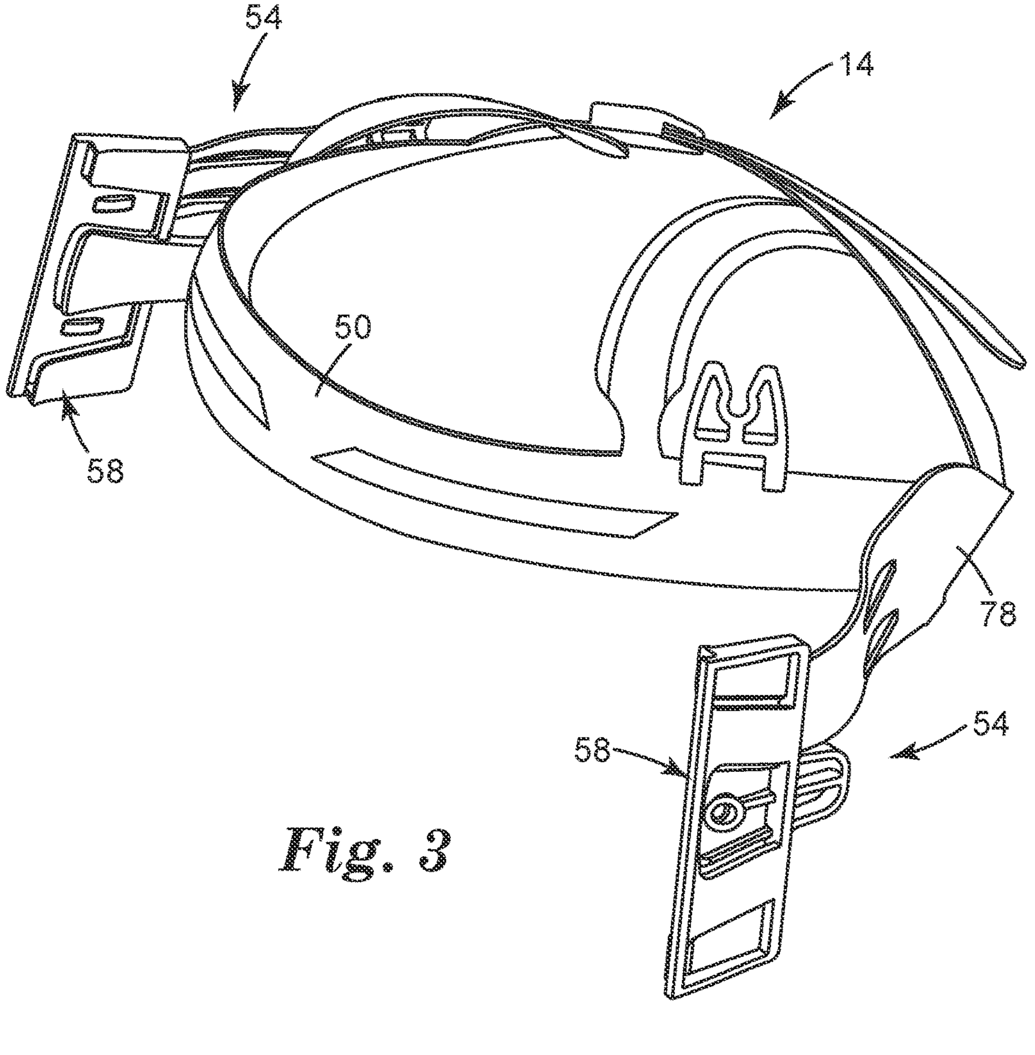
FIG. 3 is a front perspective view of an assembled head suspension system made according to an embodiment of the present disclosure.
Figure 4:
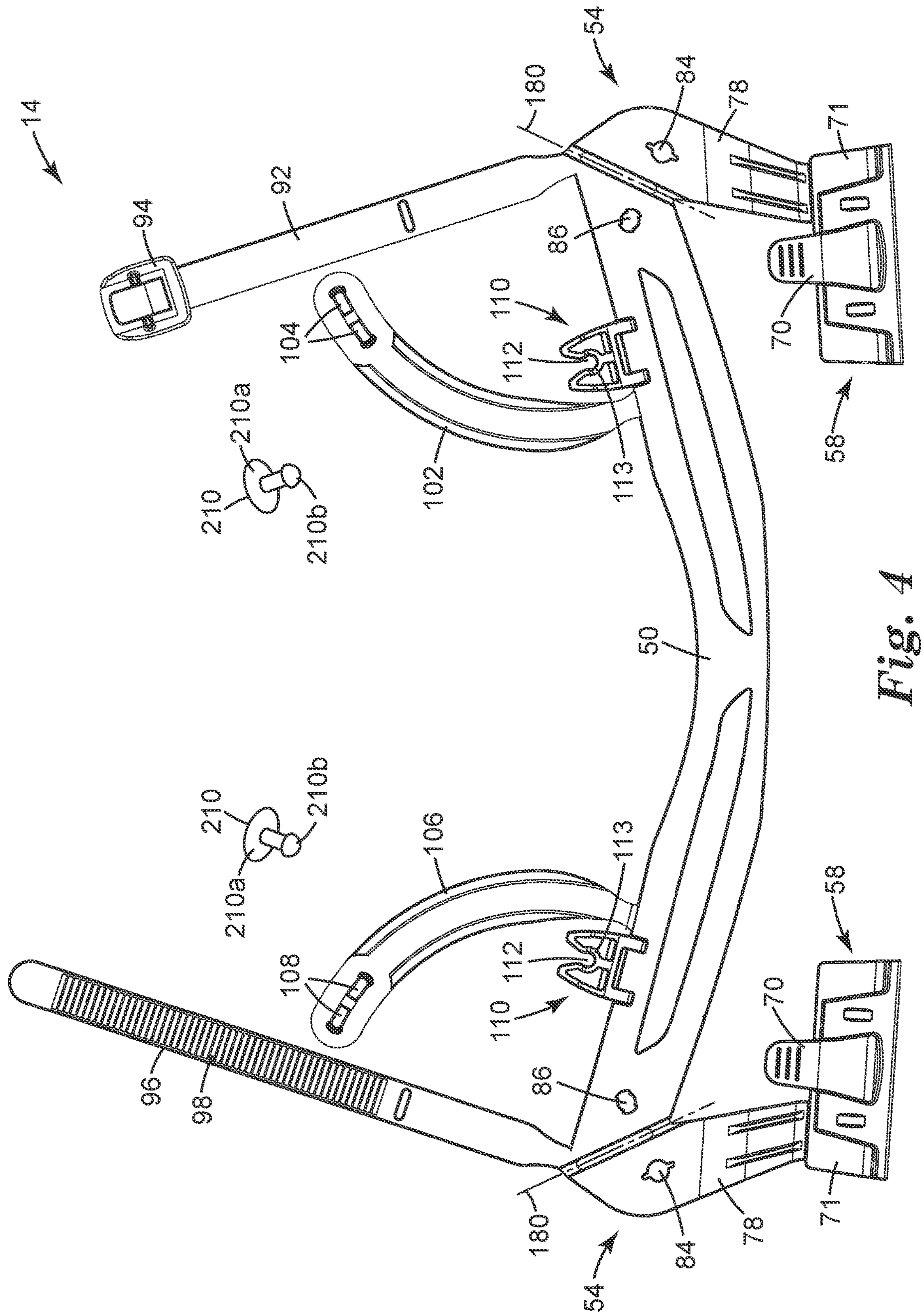
FIG. 4 is a top view of a disassembled and unfolded head suspension system made according to an embodiment of the present disclosure.

As shown in FIGS. 1, 3 and 4, the head suspension system 14 in an exemplary embodiment may include a headband member 50, such as an elongated member. The headband member 50 may be adapted to be removably attached to the visor assembly and, optionally, it may be adapted to be removably attached to the interior head cover assembly and as well. As a consequence, the major components of the respirator system 10 may be assembled and disassembled. Further, due to the foldable or unfoldable nature of the major components, the head suspension 14 on one hand, and the head cover assembly 12 with the visor assembly 16 on the other, may be folded in relatively planar configurations for reduced volume packaging, thereby providing savings during shipping, particularly when relatively large volumes are shipped. For example, one is invited to compare a) FIG. 1, which shows the head cover assembly 12 and the visor assembly 16 assembled with the head suspension system 14; b) FIG. 3, which shows the head suspension system 14 detached from the visor assembly 16 and the head cover assembly 12; c) FIG. 4, which shows the head suspension system 14 in an unfolded state, forming a generally planar configuration; and d) FIG. 5, which shows the head cover assembly 12 that has been folded and the visor assembly 16 that has been flattened to form a generally planar configuration.

In addition, a head suspension constructed according to the present disclosure can be a one-piece integral construction, which can be manufactured in a less costly manner, such as by molding. While a one-piece construction is described in relation to the illustrated embodiments, the present disclosure also considers that multiple pieces can be used for its construction. The headband member 50 may be curved to conform to a user's head and the head suspension system 14 may be formed into a three-dimensional head cradle configuration (FIG. 3).

Turning now to FIG. 3, the exemplary head suspension system 14 includes first and second releasable securing portions 54. Each of the releasable securing portions 54 includes a release mechanism 58 positioned generally adjacent end portions of the elongated headband member 50 and may be connected thereto by a wing segment 78. Since in a preferred embodiment, both release mechanisms 58 are identical, a description of one shall be deemed sufficient for understanding their construction and functions. The release mechanism 58 enables the headband member 50 to be removably attached to a lateral side of the visor assembly 16 in a manner to be described.

Figure 6A:
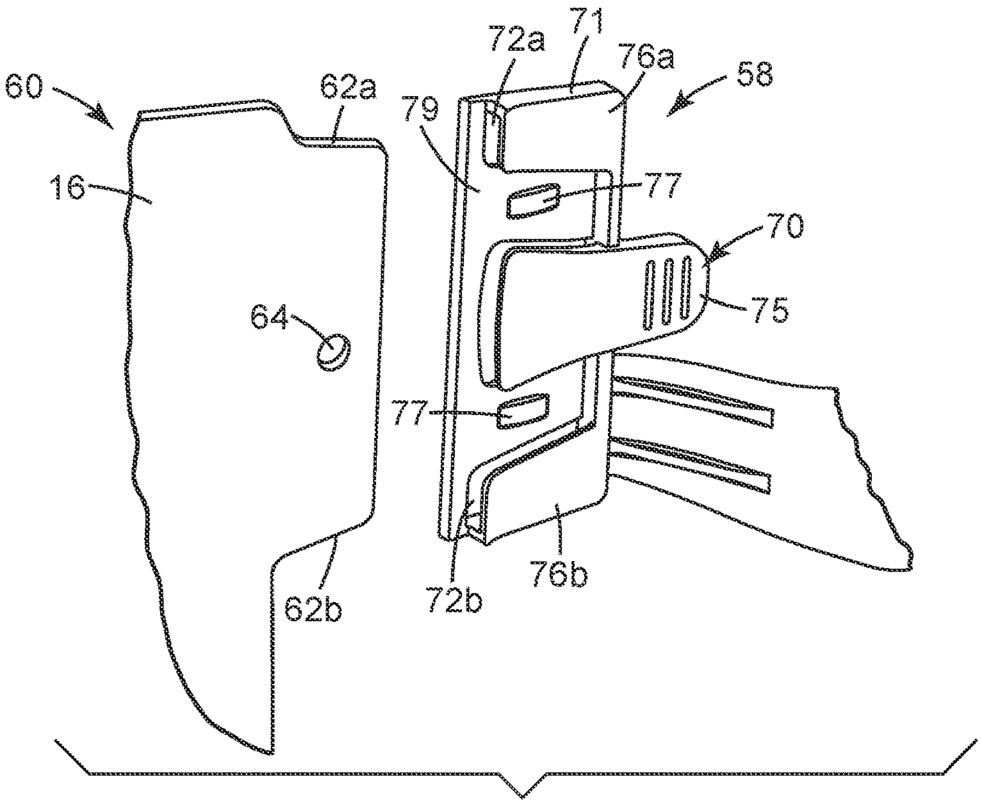
FIGS. 6A and 6B are enlarged and fragmented perspective views illustrating reverse views of opposing sides or an exemplary release mechanism according to the present disclosure.
Figure 6B:
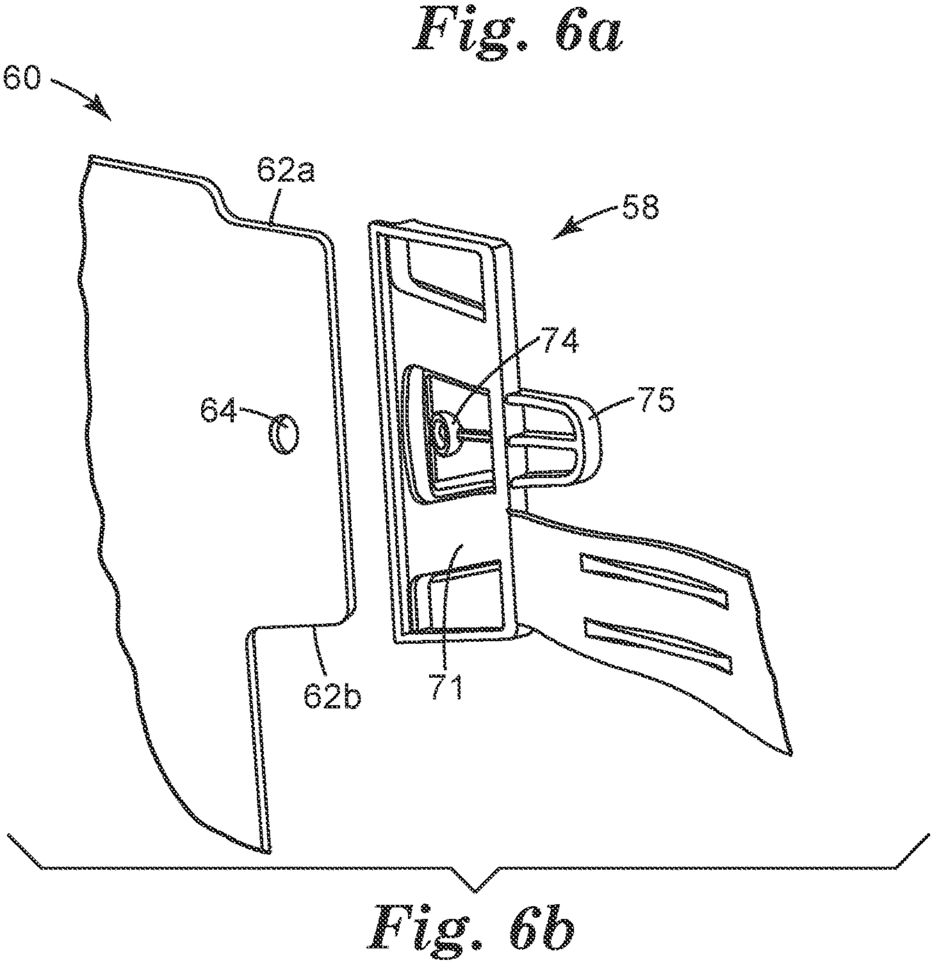

FIGS. 6A and 6B illustrate an exemplary release mechanism 58 that can be removably attached to a receiving portion of the visor, such as a lateral or side projection 60. In an exemplary embodiment, each of a pair of release mechanisms 58 is configured to be removably attached to a corresponding one of a pair of receiving portions of a visor assembly, such as a pair of lateral projections or tabs 60 disposed on opposing sides of the visor assembly 16 (e.g., on the left and right sides with respect to a user's face). Those of ordinary skill in the art will readily appreciate that the receiving portions do not need to project off the visor but instead may have any suitable configuration.

As viewed in FIGS. 6A and 6B, an exemplary release mechanism 58 may include a base section 71, here having a generally rectangular configuration, and a latch mechanism 70. The exemplary release mechanism 58 may include a ramp surface 79 and at least one retaining member 76*a* but preferably a pair of retaining members 76*a* and 76*b*. The ramp surface 79 may include one or more protrusions 77. The one or more protrusions 77 are adapted to frictionally engage a receiving portion of the visor assembly, such as a projection 60, in a manner that urges the receiving portion into a tight fitting relationship with the release mechanism and in particular with the latch mechanism 70.

The ramp surface 79 and a retaining member 76*a* may be disposed with respect to each other to define a locating groove or channel 72*a*. The locating channel 72*a* is adapted to slidably receive and retain an edge 62*a* of a side projection or tab 60 in a snug and secure manner for proper positioning. Similarly, the ramp surface 79 and a retaining member 76*b* may be disposed with respect to each other to define a locating groove or channel 72*b*. The locating channel 72*b* is adapted to slidably receive and retain an edge 62*b* of a side projection or tab 60 in a snug and secure manner for proper positioning. The locating channels 72*a* and *b* also would tend to inhibit displacement, including rotational and/or linear displacement, of the head suspension assembly 14 relative to the visor assembly 16.

The latch mechanism 70 may be adapted to be normally biased to position illustrated. In one exemplary embodiment, the latch mechanism 70 includes a latch projection 74 disposed facing toward the ramp surface 79. The latch projection 74 is configured and dimensioned such that it can be urged into an opening 64 formed in the receiving portion of the visor assembly, such as in the projection 60. In response to the engagement of the latch projection 74 with the opening 64, the relative linear displacement of the visor assembly 16 with respect to the head suspension system 14 may be reduced. Advantageously, the assemblies may be retained in proper registration during use and disengaged when desired.

The latch mechanism 70 may also include a lever 75 configured to be pressed by a user in order to release the latch projection 74 from the opening 64. In one exemplary embodiment, the latch mechanism 70 may include a resilient material that forms a living hinge, which facilitates the pivoting of the latch projection 74 away from the opening 64 in response to depression of the lever 75. Generally, to effect disengagement of the latch mechanism 70, a user would press downwardly on the lever 75 thereof to pivot its other end upwardly. The present disclosure envisions that a wide variety of releasable securing or latch mechanisms may be used in place of the exemplary embodiments described.

Figure 7:
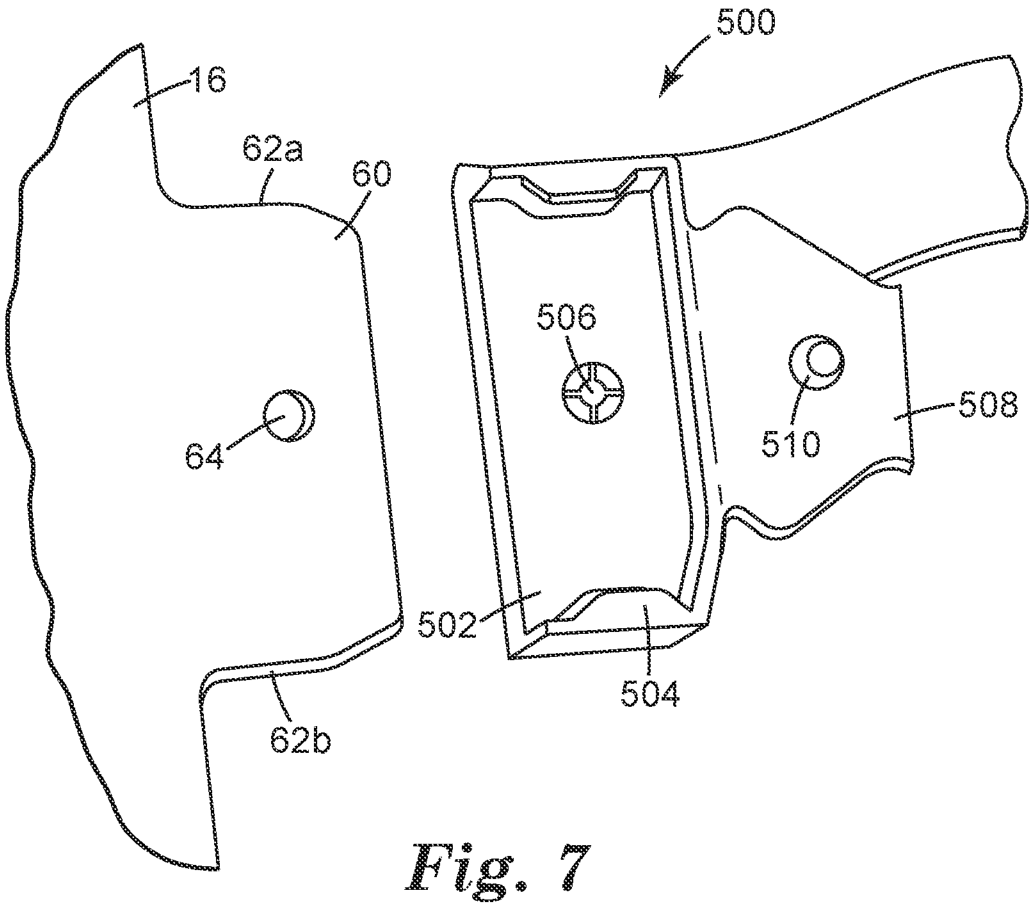
FIG. 7 is an enlarged and fragmented perspective view illustrating another exemplary embodiment of a release mechanism according to the present disclosure.
Figure 8:
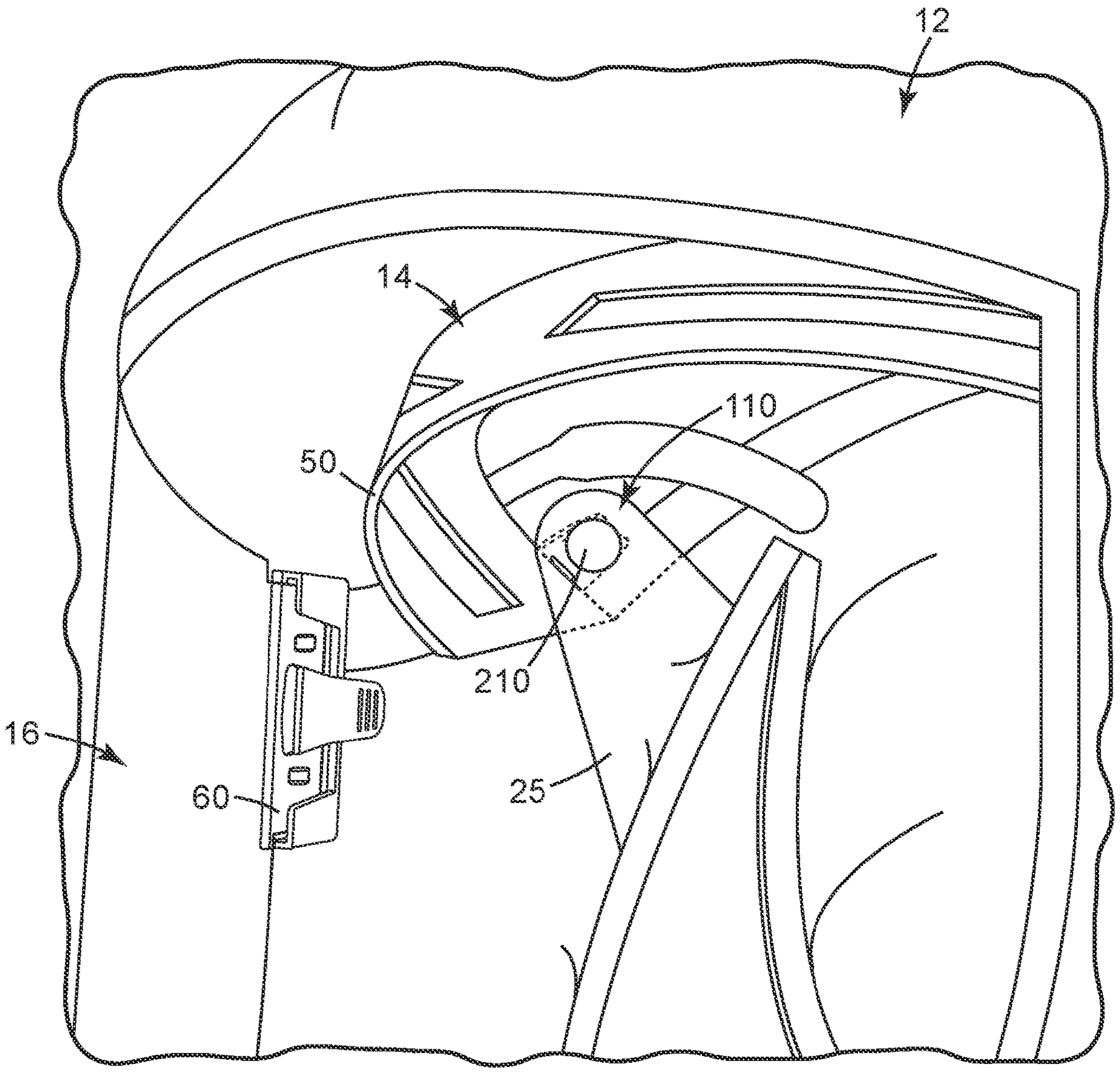
FIG. 8 is a partial enlarged perspective view of a respirator system of the present disclosure.

FIG. 7 illustrates another exemplary embodiment of a release mechanism 500. In this embodiment, the visor release mechanism 500 includes a ramp surface 502 and a ridge 504. The ridge 504 may be disposed to surround at least a portion of the periphery of the ramp surface 502. An aperture 506 is formed in the ramp surface 502. A cover member 508 is connected to the ramp surface 502, and preferably it is hingedly connected. A protrusion 510 is disposed on the cover member 508 for cooperating with an opening 64 in the visor receiving area, when the cover is brought to a closed or covering position, such that the visor receiving portion is disposed between the ramp surface 502 and the cover member 508. This arrangement, as with other exemplary embodiments, is intended to inhibit displacement of the components relative to each other.

With further reference to FIGS. 3 and 4, each of the visor release mechanisms 58 may be mounted on a respective wing segment 78 that may be folded (FIG. 3) or unfolded (FIG. 4) relative to a folding axis 180. The folding axis 180 may be defined, for example, by a living hinge type connection. While the folding is being illustrated as being accomplished by a living hinge, other suitable hinge type constructions may be utilized. With the wing segment 78 being unfolded as shown in FIG. 4, the entire head suspension system 14 is able to form a generally planar configuration. When it is desired to join the head suspension system to the visor assembly, the wing segment 78 may be folded along the folding axis 180 until the wing segment 78 is brought in an engaged relationship with the headband member 50. One example of an engaged relationship may be accomplished by providing an opening 84 in one of the wing segment 78 or the headband member 50, which opening may receive therein a projection 86 formed on the other one of the wing segment 78 or the headband member 50.

The head suspension system 14 may further include straps, such as 92, 96, connected to the headband member 50 for facilitating formation of a head cradle configuration. The strap 96 may include a plurality of ridges 98 that cooperate with a fastening buckle 94 on the strap 92 in any suitable manner. The head suspension system 14 may also include curved straps 102, 106, connected to the headband member 50, such as shown. In one exemplary embodiment, each of the straps 102, 106 may have a pair of L-shaped brackets 104, 108 formed therein. The L-shaped brackets 104 and 108 are adapted to receive therein respective ones of the straps 92 and 96. The cooperation of the straps 92 and 96 with the L-shaped brackets 104 and 108 provide the user with an approach for adjustably securing the head suspension system on the user's head. While a particular head suspension system configuration is illustrated, the present disclosure envisions that in some exemplary embodiments no straps are used or a cradle may be used in addition to or in place of straps.

FIG. 4 shows that the head suspension system 14 may further include one or more retaining members, such as a pair of spaced retaining members 110. The one or more retaining members 110 may be provided, for example, on the headband member 50 for removably attaching the head covering member 22 to the head suspension system 14. In one exemplary embodiment, the retaining members 110 each cooperate with a peg 210. More particularly, each retaining member may have a flexible wall element 113 that forms an opening 112 configured to receive a peg 210 therethrough. Thus, in an assembled configuration of this exemplary embodiment, the peg 210 extends through the opening (not shown) of the tab 25 as well as through the opening 112 of the retaining member 110. The peg 210 has an enlarged segment 210*a* at one end thereof that secures the tab 25 against the retaining member 110. The peg 210 also has an enlarged section 210*b* at the other end thereof, which allows the peg to be secured to the retaining member 110. While the retaining element 110 and the peg 210 have the size and configuration as depicted, it will be understood that other sizes and configurations may be used. It will be appreciated that a variety of mechanisms may be used to removably secure the head cover assembly 12 or the face seal portion 40 to the head suspension system 14. Also, other fastening or retaining mechanisms may be used for releaseably joining the head covering member to the head suspension system, such as hook and loop, button and button hole, and the like.

It will be appreciated that numerous and varied other arrangements may be readily devised in accordance with these principles by those skilled in the art without departing from the spirit and scope of the invention as claimed. Although the methods and system of the present disclosure have been described with referent to specific exemplary embodiments, those of ordinary skill in the art will readily appreciate that changes and modifications may be made thereto without departing from the spirit and scope of the present disclosure.

What is claimed is:

1. A respirator system comprising:

a foldable head cover assembly including a head covering portion and a face seal portion configured to contact a wearer's face during use;

a visor assembly attached to the head cover assembly;

a head suspension system removably attached to the visor assembly, the head suspension including first and second securing portions to attach to the visor assembly; and a fluid coupling arrangement removably attached to the head cover assembly;

wherein the head suspension system in an unfolded state and the visor assembly in a flattened state, form a generally planar configuration.

2. The system of claim 1, wherein an outer periphery of the face seal portion is disposed at least in part under a wearer's chin.

3. The system of claim 1, wherein the visor assembly includes at least two receiving areas, the receiving areas being located on opposing lateral sides of the visor assembly, and the head suspension system includes at least two release mechanisms each one of which releasably attaches to respective ones of the receiving areas.

4. The system of claim 3, wherein the head suspension system comprises a headband member and each release mechanism is foldable with respect to the headband member.

5. The system of claim 3, wherein each of the receiving areas comprises a tab and an opening in the tab, and wherein each of the release mechanisms comprises a projection configured to engage with a respective opening.

6. The system of claim 5, wherein each release mechanism includes at least one channel adapted to slidably receive an edge of the respective tab.

7. The system of claim 1, wherein the head suspension system is releasably secured to the head cover assembly.

8. The system of claim 7, wherein the head suspension system comprises a pair of retaining members and the head cover assembly comprises a pair of tabs, each tab being releasably secured to a respective retaining member.

9. The system of claim 1, wherein the head suspension system includes at least one adjustment strap that allows the head suspension system to be adjusted to a size of a wearer's head.

10. The system of claim 1, wherein the head suspension system is a one-piece construction.

11. The system of claim 1, further comprising a shroud attached to the head cover assembly.

12. The system of claim 1, wherein the head covering portion comprises an interior, and the fluid coupling arrangement comprises a tube portion adapted to protrude from the interior of the head covering portion.

* * * * *